May 26, 1964

F. J. HAINES 3,134,927

BEAM DEFLECTION AND CENTURING CIRCUIT USING A DIFFERENTIAL AMPLIFIER

Filed Sept. 21, 1960

INVENTOR.
FREDERICK J. HAINES

BY Joseph P. Kates

ATTORNEY

United States Patent Office 3,134,927
Patented May 26, 1964

3,134,927
BEAM DEFLECTION AND CENTERING CIRCUIT USING A DIFFERENTIAL AMPLIFIER

Frederick J. Haines, Liverpool, N.Y., assignor to General Electric Company, a corporation of New York
Filed Sept. 21, 1960, Ser. No. 57,472
13 Claims. (Cl. 315—27)

Figure 1:
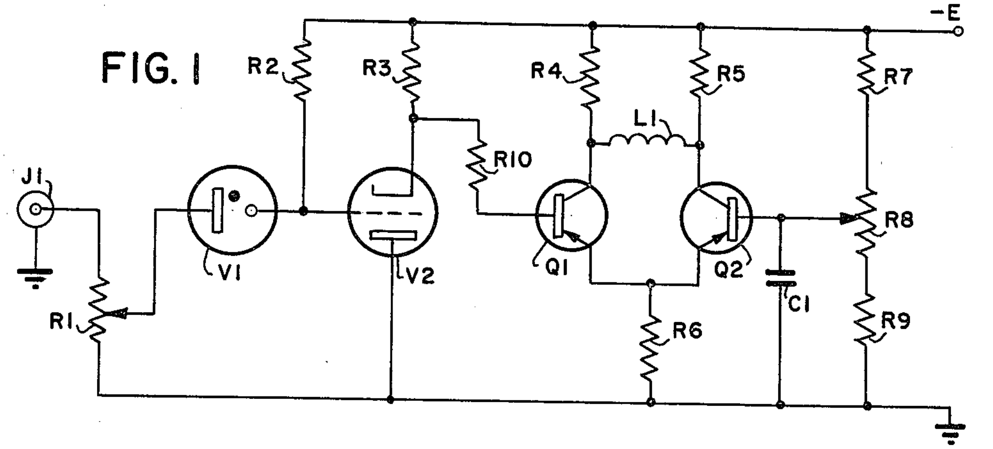

The present invention relates to a differential amplifier. More particularly it relates to a direct-coupled, transformerless, push-pull circuit employing transistors for impressing direct current (D.C.) level centering and decentering voltages together with alternative current (A.C.) sweep voltages on the deflection coil or inductor of an electromagnetically deflected light-image pick-up device.

In this invention, a pair of transistor amplifiers having an emitter resistor common to both are connected in push-pull. Separate D.C. level centering voltages are applied to the base of each transistor. Their collectors are joined by a deflection coil such that any unbalance in the D.C. voltages applied causes current flow through the deflection coil in accordance with the difference. The base of one of the transistors is connected to a balance control potentiometer to provide an adjustable fixed D.C. centering potential. The base of the second transistor is responsive to input D.C. centering voltage and an A.C. sweep voltage. The second transistor base is connected to the output of a cathode follower, an emitter follower or a Zener diode. This provides proper input base resistance for that transistor stage when coupling A.C. voltage and shifting the D.C. level on which the A.C. voltage rides to that required for transistor base operation. The emitter follower and cathode follower in those embodiments is in series with a voltage regulator stage and a high or low impedance input. A fixed voltage drop occurs across the voltage regulator tube such that an A.C. signal which varies about a predetermined D.C. level when passed through the voltage regulator tube will vary about a D.C. level which represents the difference between the predetermined D.C. level and said fixed voltage drop. This transposition of input D.C. level a fixed amount allows correct bias on the base or control electrode, respectively, of the emitter follower or cathode follower stage. Thus a centering or decentering fixed or variable D.C. voltage is shifted to proper bias voltage level and applied at the base of the first stage of the push-pull differential transistor amplifier.

Prior art deflection circuits do not permit introduction of decentering potentials simultaneously with the sweep signal waveform because other than direct-current coupling is normally employed. Pre-distortion of the deflection waveform is necessary usually in order to compensate for the inductive reactance of the deflection coil. This requires transformers to match vacuum tube and deflection coil impedances since most deflection coils are of relatively low impedance.

In some prior art deflection circuits the deflection coil is connected between the anodes of the two tubes of a push-pull amplifier and driven directly. A common cathode resistor provides coupling between the tubes. Electron beam centering where provided is effected in several ways. In one device the centering is accomplished by variable resistors in each cathode circuit and by a potentiometer arrangement whereby the grid potential of one tube is varied. In another arrangement electron beam centering adjustment is made by means of a potentiometer arrangement whereby the quiescent current through the deflection coils is varied.

In my invention a direct-coupled, transformerless, deflection circuit utilizing transistors solves prior art problems in enabling introduction of decentering potentials simultaneously with the sweep signal waveform and eliminates pre-distortion of the deflection waveform required for compensation because transistors are superior to vacuum tubes as constant-current generators. My invention provides compensation for temperature and similar variation. It enables conversion of the D.C. applied reference level of A.C. sweep voltage to a D.C. reference level required in the input of the transistor amplifier circuit. Desired changes in D.C. level of incoming sweep voltage are effected while maintaining the level necessary for operation of the transistors in push-pull. Symmetry is maintained by making the base impedances of the two transistors of the differential amplifier identical. This insures D.C. drift cancellation also. Transistors approximate constant-current signal sources. Hence, the deflection coil current assumes the shape of the incoming deflection signal voltage. Driving the coil from a constant current generator allows the voltage across the coil to be free to fluctuate as required.

Accordingly, an object of the present invention is to provide means for introducing simultaneously sweep voltage and a plurality of centering potentials which may include a remotely controlled variable centering potential into the deflection coil of an electromagnetically deflected light image pick-up device.

Another object of the present invention is to provide a transistorized differential amplifier wherein an A.C. sweep voltage is transmitted therethrough with its level set simultaneously in accordance with a first adjustable fixed reference D.C. potential and a second remotely controlled variable D.C. potential to provide a D.C. level of the A.C. waveform through the deflection coil which varies in accordance with the difference between the D.C. potentials applied to the amplifier inputs.

Another object of the present invention is to provide a symmetrically operated D.C. drift compensated, deflection circuit wherein the centering potentials are directly coupled in with and simultaneously applied with the sweep signal waveform, and which circuit dispenses with necessity for predistortion of the deflection waveform to compensate for the inductive reactance of the deflection coil and dispense with transformers.

Figure 2:
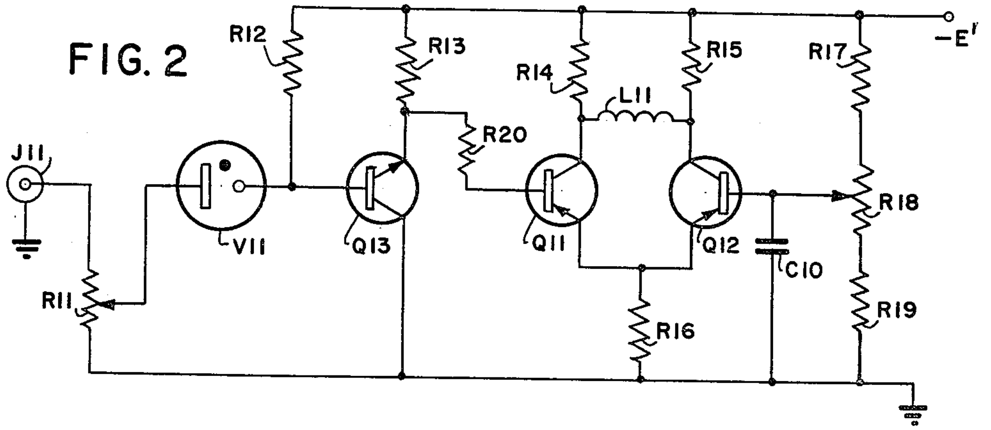
Figure 3:
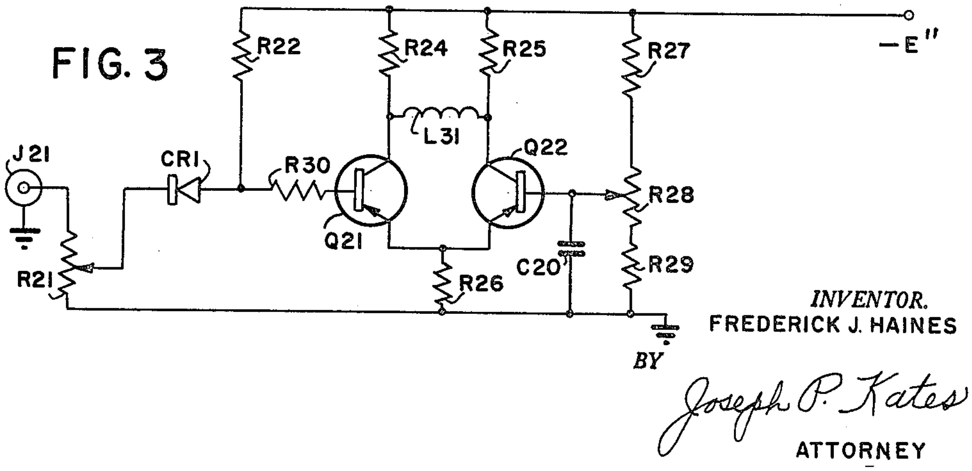

While the novel and distinctive features of the invention are particularly pointed out in the appended claims, a more expository treatment of the invention, in principle and in detail, together with additional objects and advantages thereof is afforded by the following description and accompanying drawing in which:

FIG. 1 is a schematic diagram of a first illustrative embodiment of the deflection circuit of the invention incorporating a voltage regulator and a cathode follower between the input and a differential amplifier;

FIG. 2 is a schematic diagram of a second illustrative embodiment of the deflection circuit of the invention incorporating a voltage regulator and an emitter follower between the input and a differential amplifier; and FIG. 3 is a schematic diagram of another illustrative embodiment of the deflection circuit of the invention wherein a Zener diode is connected directly to the input of a differential amplifier.

Referring to the drawings and in particular to FIG. 1 a jack J1 is provided. A deflection signal waveform the shape of which is any of a number of desired deflection coil current waveshapes is fed into jack J1. A gas regulator tube voltage regulator stage V1 having an anode and a cathode is coupled from the jack J1 through a potentiometer R1. Potentiometer R1 is the sweep size control potentiometer. The resistance portion of the potentiometer R1 is disposed across jack J1 (between the high side of jack J1 and ground). Potentiometer R1 has a slidable contact arm which is directly connected to the anode of the voltage regulator stage V1.

A source of negative voltage —E is provided. Source —E may be a voltage of the order between minus 10 volts and minus 150 volts. A triode cathode follower stage V2 is provided having a grounded plate, a cathode and a control electrode. A cathode resistor R3 is disposed between the source —E and the cathode of cathode follower V2. A firing resistor R2, which is of relatively high resistance, is disposed between the source —E and the junction between the control electrode of stage V2 and the cathode of the regulator tube V1, allowing V1 to draw current and fire or ignite.

A pair of PNP transistors Q1 and Q2 are connected in push-pull. Alternatively both transistors Q1 and Q2 could be NPN transistors. The emitters of stages Q1 and Q2 are joined together electrically. A resistor R6 common to the emitters of both stages Q1 and Q2, is disposed between the junction of these emitters and ground.

A deflection coil L1 is connected between the collectors of stages Q1 and Q2. Between the cathode follower stage V2 and the base of stage Q1 is a resistor R10. Resistor R10 is a base resistor for transistor Q1. Resistor R10 makes the base impedance of transistor Q1 equal to the base impedance of transistor Q2 in order to maintain symmetry and, thereby, insured D.C. drift cancellation. A resistor R4 is disposed between the collector of transistor Q1 and source —E. A resistor R5 is disposed between the collector of transistor Q2 and the source —E.

A voltage divider comprising a resistor R7, a balance control potentiometer R8 and a resistor R9, respectively are disposed across the source —E. Resistor R9 is grounded at one end. Resistor R7 is connected at one end to the source —E. The other ends of resistors R7 and R9 respectively are connected to the ends of the resistance element of the balance control potentiometer R8. Balance control potentiometer R8 has a slidable contact arm which is connected directly to the base of transistor Q2. A capacitor C1 is connected between the base of transistor Q2 and ground, thus the transistor Q2 base is grounded for A.C.

Centering and decentering of the deflection current is effected by adjusting the balance control potentiometer R8. When the balance control is set to the particular point where the base currents of transistors Q1 and Q2 are equal, no D.C. current will flow in the deflection coil. A D.C. component introduced at the base of transistor Q1 will produce a change in deflection centering. Sweep centering changes may be produced also by unbalancing the circuit with the centering control R8. The D.C. component provide at the base of transistor Q1 is the D.C. component introduced at jack J1, fed with the A.C. component through the resistance portion of the sweep size control potentiometer R1 then fed through its slidable contact arm and converted to the required base voltage by the voltage drop in transmission across voltage regulator V1. The A.C. voltage and the shifted D.C. voltage are introduced at the grid of cathode follower V2. The cathode follower V2 cathode voltage follows its grid voltage. Hence, a voltage corresponding to the applied A.C. and D.C. voltage appears at the cathode of cathode follower V2. The changed D.C. voltage and the A.C. sweep voltages are coupled directly from the cathode of cathode follower V2 through resistor R10 to the base of transistor Q1. This applied A.C. and D.C. signal voltage is amplified in stage Q1 and appears at its collector. The change in stage Q1 collector voltage provides D.C. unbalancing between the opposite ends of the deflection coil. This causes a deflection of the entire A.C. sweep signal in accordance with the D.C. provided at jack J1. Adjusting the contact arm of the balance control potentiometer R8 changes the center of the sweep signal.

Referring to FIG. 2 the circuit differs from that of

FIG. 1 in that a transistor emitter follower Q13 is utilized and the cathode follower V1 is omitted.

In the FIG. 2 device the D.C. and A.C. components (the A.C. signal at the set D.C. level) are coupled through the sweep size control potentiometer R11 and through voltage regulator stage V11. As is the case of tube V1 in the FIG. 1 embodiment, gas regulator tube V11 conducts the current flowing through resistor R12 and maintains a constant potential drop across itself. It couples both the D.C. and A.C. signal components to the base of transistor stage Q13. As in stage V1 of the FIG. 1 embodiment, stage V11 of the FIG. 2 embodiment is required to couple the signal components from nearly 0 (zero) volts D.C. reference potential on which the A.C. signal rides (for example in the neighborhood of 2 or 3 volts) to a relatively high D.C. reference potential (for example about 50 volts negative). In the FIG. 1 circuit a relatively high potential at the base of transistor Q1 is required for the D.C. operating conditions of transistors Q1 and Q2. The FIG. 2 deflection coil differential amplifier comprises a transistorized cathode-coupled, push-pull circuit comprising transistors Q11 and Q12. Relatively high potential is required also at the base of transistor Q1 in the FIG. 2 embodiment. As in the FIG. 1 embodiment transistors Q11 and Q12 are identical transistors and could be either NPN or both PNP transistors. Because transistors Q11 and Q12 are a symmetrical circuit any D.C. drift due to temperature changes are cancelled. Resistor R20 supplies a function similar to that of resistor R10 of the circuit of FIG. 1. It makes the base impedance of transistor Q11 equal to the base impedance of transistor Q12. It maintains symmetry and insures D.C. cancellation of effects which could cause D.C. drift.

Deflection coil L11 is connected between the collectors of transistors Q11 and Q12. The approximate constant current signal sources which the transistors approximate permit the deflection coil current to assume the shape of the deflection signal input voltage at jack J11.

The base of transistor Q12 is connected in voltage divider circuit comprising resistor R17, potentiometer R18 and resistor R19 disposed across the voltage source —E. The arm of potentiometer R18 is connected directly to the base of transistor Q12. A base capacitor C11 is disposed between the base of transistor Q12 and ground. The balance control potentiometer R18 allows centering and decentering (shifting) of the deflection current waveforms. When the balance control R18 is set at the point where the base currents of transistors Q11 and Q12 are equal, no D.C. current flows in the deflection coil L11. A D.C. component coupled in through jack J11 through the voltage regulator tube V11 and the emitter follower Q13 and applied at the base of transistor Q11 produces a change in deflection centering. Sweep centering changes may also be produced by unbalancing the circuit with the centering control potentiometer R18.

Any change in the D.C. level at J11, for example, a desired change made remotely and coupled through the voltage regulator V11 and the emitter follower Q13 to the base of transistor Q11 causes corresponding D.C. changes in the sweep through the deflection coil L11 and is therefor observable upon the display tube (not shown)

Now referring to FIG. 3 the circuit differs from those of FIGS. 1 and 2 in that a Zener diode CR1 replaces both stages V1 and V2 of FIG. 1 and stages V11 and Q13 of FIG. 2.

The A.C. signal superimposed on a predetermined D.C. level is coupled through jack J21. The A.C. signal rides on a D.C. level at about near 0 voltage (about 2 or 3 volts). It is coupled through potentiometer R21, the sweep size control, and a constant voltage drop is maintained across Zener diode CR1. Tubes V1 and V11 require large resistors R2 and R12, respectively in the FIG. 1 and FIG. 2 devices. The Zener diode CR1 does not require a large impedance as in the case of the voltage regulator tubes V1 and V11. Therefore, resistor R22 of the FIG. 3 device is smaller. It is of resistance value to provide proper base resistance for stage Q21 in conjunction with resistor R30 which makes the total base resistance of transistor Q21 equal to the total base resistance of transistor Q22. Transistors Q21 and Q22 are connected together as a differential amplifier. The emitters of transistors Q21 and Q22 are connected together and are connected through a resistor R26 to ground. Collector transistors R24 and R25 comprise the collector resistors of transistors Q21 and Q22, respectively. Resistor R24 is disposed between the collector of transistor Q21 and negative source −E″. Resistor R25 is disposed between the transistor Q22 collector and the source of negative voltage −E″. Resistor R22 is connected between the voltage source −E″ and the plate of the Zener diode CR1. The cathode of the Zener diode CR1 is connected to the contact arm of the potentiometer of the sweep size control potentiometer R21. Resistor R30 is connected between the junction between resistors R22 and the plate of the Zener diode CR1 and the base of transistor Q21. A voltage divider comprising a resistor R27, a balance control potentiometer R28 and a resistor R29 are connected across the source of voltage −E″. The slidable contact arm of potentiometer R28 is connected to the base of transistor Q22. Capacitor C20 is connected between the base of transistor Q22 and ground. The deflection coil L21 is connected between the collectors of the stages Q21 and Q22. Potentiometer R28, the balance control potentiometer, introduces the centering potential. D.C. reference potential for the A.C. sweep voltage is coupled with the A.C. through jack J21 therethrough the potentiometer R21, and through the Zener diode CR1 across which it is dropped to that required for the stage Q21 base voltage. The Zener diode provides a constant voltage drop across itself, as do voltage regulator tubes V1 and V11. Thus, the A.C. signal input to jack J21 appears at the base of transistor Q21 except that it rides on about a negative 50 volt D.C. reference, for example, instead of about 2 or 3 volts. At the same time because of the action of the Zener diode CR1 and the resistance of resistor R22 the base potential is correct for operating stage Q21. The D.C. centering voltage may be changed remotely and continuously if desired by input to jack J21 in this manner. The same voltage drop appears continuously across Zener diode CR1. In the FIGS. 1 and 2 embodiments normal firing of voltage regulator stages V1 and V11 is prevented by the low base impedance of Q1 and Q11. The cathode follower or emitter follower stages are provided therefore to provide transformation between the high impedance required by the voltage regulator and the low impedance of the base circuit, thus allowing stages V1 and V11 to fire. Proper base resistance is provided by the utilization of the cathode follower and emitter follower stages, respectively, in the devices of FIGS. 1 and 2. In the FIG. 3 device, no cathode or emitter follower is required because a Zener diode will fire even loaded down by the base impedance of transistor Q21. This is true since a Zener diode is a low impedance device. Resistor R22 can be the value base resistance required for transistor Q21. The FIG. 3 embodiment provides a fixed drop in potential across an input voltage regulator by the Zener diode CR1 which lowers the voltage at the base of the first differential amplifier stage Q21. An impedance coupler in the FIG. 1 and FIG. 2 embodiments or the cathode follower V2 or emitter follower Q13 is required for transforming to the lower impedance needed for the input to the differential amplifier transistor circuit. The device of FIG. 3 utilizes a device, the Zener diode CR1 which does not require a high impedance output and which therefore works into the base of Q21 properly. The zener diode CR1 used in the FIG. 3 embodiment can work into a low terminating impedance. Therefore, one resistor R22 can be the base resistor of transistor Q21 and also the resistor following the diode CR1 in series to source −E″. However, a Zener diode is more expensive than a voltage regulator tube and it is not as reliable for holding a constant voltage drop, at the present state of the semiconductor art.

The differential amplifier circuit comprising stages Q1 and Q2 which are both either NPN transistors or PNP transistors compensates thereby for drift which would otherwise occur because of temperature changes and other ambient conditions. It must be understood that when a change from NPN to PNP transistors or vice versa in any of the figures is made, the supply potential (−E, −E′ or −E″) must be changed to suit; i.e. with PNP −E, and with NPN +E. Also reversing of all circuit components which are sensitive to voltage polarities must be effected. These would include tubes V1, V11, V2, transistor Q13, Zener diode CR1, and capacitors C1, C10, C20; the latter three only if electrolytic or similar polarized type capacitors.

The invention thereby provides a means for applying a centering voltage across an inductor wherein D.C. centering voltages are applied to one or both transistor base or bases in a push-pull transistor circuit one of the two D.C. voltages being applied remotely in conjunction with an A.C. component superimposed thereon.

In the inventive embodiments centering voltages are applied to a direct coupled deflection circuit both remotely by D.C. input together with A.C. and locally through a manually adjustable balance control potentiometer. However the last mentioned balance control may also be remote if desired. In the invention change of the reference voltage level is effected by passing through a voltage regulator or a Zener diode to provide correctly shifted level for applying to the base of a transistor. This transistor is one of a pair used as a differential amplifier. The same type transistors are utilized in the differential amplifier. This prevents drift under varying ambient conditions. The invention eliminates need for pre-distortion of the deflecting waveform in order to compensate for the inductive reactance of the deflection coil. This is because the transistors are low-impedance devices, approximating a constant-current signal source much more closely than vacuum tubes utilized in prior art devices. The inventive device is adaptable for various forms of deflection waveforms. The transistors comprising the differential amplifier are utilized in push-pull.

Obviously other modifications are also contemplated and are within the scope of the invention. For example if the circuit is supplied D.C. current from two power supplies, one positive and one negative, the base of transistor Q1 can be adjusted to be near the D.C. reference level of the input signal at jack J1. In such case stages V1 and V2 in the FIG. 1 embodiment and stages V11 and Q2 in the FIG. 2 embodiment are not required. In the FIG. 1 embodiment stage V2 can be omitted if the base potential of transistor Q1 is adjusted to equal to a higher than the ignition potential of the gas regulator tube V1.

While not to be considered as limiting the scope of the present invention an illustrative embodiment of the devices of FIGS, 1, 2 and 3 may have the following values.

| Part: | Designation or value |
|---|---|
| Tubes— | |
| VI | 5651 |
| V2 | 6BK7A |
| VII | 5651 |
| Transistors— | |
| Q1 | 2N553 |
| Q2 | 2N553 |
| Q11 | 2N533 |
| Q12 | 2N553 |
| Q13 | 2N167 |
| Q21 | 2N553 |
| Q22 | 2N553 |

| Part: | Designation or value |
|---|---|
| Potentiometers— | |
| R1 | 1000 |
| R8 | 5000 |
| R11 | 1000 |
| R18 | 5000 |
| R21 | 1000 |
| R28 | 5000 |
| Capacitors— | |
| C1 | mfd.. 4 |
| C10 | mfd.. 4 |
| C20 | mfd.. 4 |
| Diode— | |
| CR1 | 1N1835 |
| Inductors— | |
| L1, L11, L31 (yoke winding) | mh.. 50 |
| Resistors— | |
| R2 | 27K |
| R3 (1 watt) | 12K |
| R4 (5 watt) | 1000 |
| R5 (5 watt) | 1000 |
| R6 (10 watt) | 900 |
| R7 | 10K |
| R9 | 15K |
| R10 | 6200 |
| R12 | 27K |
| R13 | 18K |
| R14 (5 watt) | 1000 |
| R15 (5 watt) | 1000 |
| R16 (10 watt) | 900 |
| R17 | 10K |
| R19 | 15K |
| R20 | 6200 |
| R22 (1 watt) | 6800 |
| R24 (5 watt) | 1000 |
| R25 (5 watt) | 1000 |
| R26 (10 watt) | 900 |
| R27 | 10K |
| R29 | 15K |
| R30 | 5000 |
| Voltages— | |
| —E, —E′, —E″ = | volts.. —150 |

All resistors=½ watt unles otherwise noted.

While a specific embodiment of the invention has been shown and described, it should be recognized that the invention should not be limited thereto. It is accordingly intended in the appended claims to claim all such variations as fall within the true spirit of the invention.

What is claimed is:

1. A differential amplifier comprising a first transistor, a second transistor, each of said transistors having a base, emitter and collector, an emitter resistor common to the emitters of said first and second transistors, deflection coil connected between the collectors of said transistors, means to apply a waveform comprising a first D.C. and an A.C. voltage to a first terminal, means to apply an adjustable second D.C. voltage to said second transistor, constant voltage dropping means coupled between said first terminal and said first transistor passing said A.C. voltage for shifting the D.C. component of said waveform to a level in the range of said second D.C. voltage, the difference between the D.C. voltages applied to said respective transistors thereby causing deflection deviation of the reference of said A.C. voltage across said deflection coil an amount corresponding to said difference.

2. Deflection means for introducing centering potentials simultaneously with sweep signal waveform comprising a deflection coil, a differential amplifier comprising a first and a second transistor each having a base, emtiter and collector, each transistor having a common emitter resistor, said coil being coupled between the collectors of said transistors, an adjustable D.C. centering input voltage applied to the base of said second transistor, means to apply together from a remote point to said first transistor base an input A.C. and an input D.C. voltage, said last-named means comprising serially connected, A.C. voltage passing, D.C. voltage reference means to convert the level of the remote point input D.C. voltage to that suitable for optimum operation of the base of said first transistor, the difference between said D.C. centering voltage level and converted D.C. input level causing current flow through said coil to shift the D.C. reference level of said A.C. voltage correspondingly.

3. The apparatus of claim 2 wherein a cathode follower having a cathode and a control electrode is provided coupling said level conversion means to the base of said first transistor, resistance means proportioned to equalize the base impedances of said first and said second transistor coupled between the cathode of said cathode follower and the base of said first transistor, a cathode resistor coupled to said cathode, an input resistor of relatively large value larger than the value operable for base resistance of said first transistor stage, said input resistor being disposed between the control electrode of said cathode follower and the cathode resistor of said cathode follower.

4. The apparatus of claim 3 wherein said voltage level conversion device comprises a gas regulator tube which maintains a constant potential drop across itself while coupling both A.C. and D.C. components from said input means to the control electrode of said cathode follower, said cathode follower providing high to low impedance transformation to permit said gas regulator tube to fire while coupling both D.C. and A.C. signal input components to the base of said first transistor, said gas regulator tube coupling the A.C. signal components from near zero volts D.C. reference to a relative high D.C. reference potential required for D.C. operating conditions of said transistor stages.

5. A deflection circuit for electromagnetically deflected light-image pick-up devices, said deflection circuit comprising a deflection coil, a direct-coupled, push-pull, transistor deflection amplifier circuit comprising a first and a second transistor each having a collector, a base and an emitter, the emitters of said first and second transistors being joined together, a resistor disposed between said emitters and ground, said deflection coil being connected between said first and second transistor collectors, a voltage source, a pair of collector load resistors, each collector resistor being connected between said voltage source and one of said first and second transistor collectors, a voltage divider connected across said source and including adjustable first D.C. centering voltage means directly connected to the base of said second transistor, means to apply an input signal comprising a second D.C. centering voltage on which is superimposed an A.C. desired deflection characteristic voltage, means to maintain a constant potential drop across itself while coupling both D.C. and A.C. signal voltage components thereacross, an impedance transformer disposed between said constant potential drop means and the base of said first transistor stage to permit operation of said potential drop means while coupling both D.C. and A.C. inunt signal components to the base of said first transistor, said potential drop means thereby providing for coupling of signal components from a first D.C. reference level to a second D.C. reference level substantially removed from said first D.C. level, and a resistor connected between the output of said impedance transformer and the base of said first transistor to maintain symmetry.

6. The apparatus of claim 5 wherein each of said transistors are of the same type and identical to cancel D.C. drift due to ambient physical condition changes and to maintain symmetry.

7. The apparatus of claim 5 wherein said impedance transformer comprises a cathode follower.

8. The apparatus of claim 5 wherein said impedance transformer comprises an emitter follower.

9. A differential amplifier comprising a first and a second transistor stage, each of said stages having a collector, a base and an emitter, the emitters of said first and second stages being electrically connected together, a resistor coupled between said connected emitters and ground, a source of potential, a collector load resistor coupled between each of said collectors and said source, a deflection coil coupled between the collectors of said first and said second transistor, adjustable first D.C. potential means connected to be applied to the input of said second transistor, second D.C. voltage and accompanying A.C. input voltage applied to said first transistor, said D.C. voltage applied to said first transistor being substantially of the magnitude of said first D.C. voltage applied to said second transistor, D.C. reference of the A.C. output across said deflection coil being deflected in proportion to the difference of the D.C. component applied to said first transistor and the D.C. applied to said second transistor.

10. A circuit for providing a deflection sweep signal waveform simultaneously with de-centering potentials comprising a first and a second transistor each of said transistors having a base, emitter and collector, and having their emitters joined together and disposed in push-pull relationship, an emitter resistor common to both transistors connected to their joined emitters, a voltage source, a first transistor collector resistor and a second transistor collector resistor connected between the respective collectors of said transistors and said voltage source, a deflection coil connected between the collectors of said transistors, adjustable balance control voltage means connected to the base of one of said transistors to thereby provide a D.C. centering voltage at one end of said coil, means to apply an A.C. deflection voltage and a second D.C. decentering voltage, said A.C. signal riding on said second D.C. de-centering voltage, means to convert the level of said second D.C. voltage such that said A.C. voltage rides on a D.C. level which is a predetermined voltage removed from said input level, and means to couple said A.C. voltage and said removed D.C. level to the base of said first transistor stage.

11. The apparatus of claim 10 wherein said voltage level converting means comprises a voltage regulator tube and said base coupling means includes an emitter follower coupled between the output of said regulator and the base of said first transistor, high input resistance means in series with said voltage regulator coupled across the input of said emitter follower, said emitter follower having an emitter resistor, means to couple the emitter follower emitter to the base of said first transistor, to thereby provide a constant D.C. potential change across said voltage regulator while coupling both A.C. and D.C. signal components to the base of said emitter follower, said emitter follower serving as an impedance transformer providing an input high impedance to said voltage regulator while coupled to the low input transistor base impedance, said regulator and emitter follower coupling both D.C. and A.C. signal components from said second D.C. centering voltage and A.C. voltage applying means to the base of said first transistor, said base requiring said connected D.C. voltage level obtained after drop by said voltage regulator from initial D.C. level condition.

12. A circuit for introducing de-centering and centering potentials simultaneously with sweep signal waveform in a deflection coil, said circuit comprising a first and a second transistor, each having a base, emitter and collector, said transistors being connected in push-pull relationship and having their emitters electrically connected, a first reference potential source and a second source of potential, a resistor connected between the said connected emitters and said first reference source of potential, first and second collector resistors each respectively coupled between said first collector and said second collector and said second source of potential, means to provide a first D.C. centering voltage to the base of said second transistor, means to apply an A.C. sweep voltage superimposed on a second D.C. centering voltage to the base of said first transistor, a Zener diode having a plate and cathode providing voltage drop thereacross to required D.C. level for said transistor base, resistance means in series with said Zener diode of size to provide base resistance for operation of said first transistor, a resistor coupled between the plate of said Zener diode and the base of said first transistor proportioned to equalize the D.C. impedance between the base of said first transistor and said first reference potential source and the D.C. impedance between the base of said second transistor and said first reference potential source, a sweep size control potentiometer connected between said A.C. and D.C. voltage applying means and the cathode of said Zener diode, said deflection coil being connected between said transistor collectors.

13. The apparatus of claim 12 wherein said first and said second transistors are each of the same conductivity type.

References Cited in the file of this patent

UNITED STATES PATENTS

| | | |
|---|---|---|
| 2,315,848 | Geohegan | Apr. 6, 1943 |
| 2,728,028 | Carpenter | Dec. 20, 1955 |
| 2,762,870 | Sziklai | Sept. 11, 1956 |
| 2,853,650 | Close | Sept. 23, 1958 |
| 2,933,623 | Jones et al. | Apr. 19, 1960 |